(12) United States Patent
Hung

(10) Patent No.: US 9,685,993 B2
(45) Date of Patent: Jun. 20, 2017

(54) POWER LINE COMMUNICATION CONTROL SYSTEM

(71) Applicant: AMTB Technology, Kaohsiung (TW)

(72) Inventor: Yu-Cheng Hung, Kaohsiung (TW)

(73) Assignee: AMTB Technology, Kaohsiung (TW)

( * ) Notice: Subject to any disclaimer, the term of this patent is extended or adjusted under 35 U.S.C. 154(b) by 0 days.

(21) Appl. No.: 15/088,152

(22) Filed: Apr. 1, 2016

(65) Prior Publication Data

US 2016/0294218 A1   Oct. 6, 2016

(30) Foreign Application Priority Data

Apr. 2, 2015   (CN) .......................... 2015 1 0153801
Apr. 2, 2015   (TW) ............................. 104111039 A

(51) Int. Cl.
*H04B 3/54*      (2006.01)
*H02J 13/00*   (2006.01)

(52) U.S. Cl.
CPC .............. *H04B 3/54* (2013.01); *H02J 13/002* (2013.01)

(58) Field of Classification Search
CPC ................................. H04B 3/54; H02J 13/002
See application file for complete search history.

(56) References Cited

U.S. PATENT DOCUMENTS

| | | | | |
|---|---|---|---|---|
| 4,434,396 A * | 2/1984 | Montague | .............. | H02H 9/005 323/230 |
| 4,476,521 A * | 10/1984 | Kljucaricek | ............ | H02M 7/08 323/344 |
| 6,844,810 B2 * | 1/2005 | Cern | ..................... | H03H 7/0115 333/24 C |
| 7,170,367 B2 * | 1/2007 | Cern | ........................ | H01P 5/02 333/24 R |
| 8,141,787 B2 * | 3/2012 | Savry | .................. | G06K 19/072 235/375 |
| 8,164,929 B2 * | 4/2012 | Zimpfer | .................. | A61B 6/56 363/34 |
| 8,554,033 B2 * | 10/2013 | Kewitsch | ............. | G02B 6/3895 340/505 |
| 9,186,120 B2 * | 11/2015 | Zimpfer | .................. | A61B 6/56 |
| 2003/0160684 A1 * | 8/2003 | Cern | ........................ | H04B 3/56 307/104 |
| 2016/0072443 A1 * | 3/2016 | Mizokami | ............... | H03F 1/565 330/295 |

* cited by examiner

*Primary Examiner* — Jean B Corrielus

(74) *Attorney, Agent, or Firm* — Steven Reiss

(57) ABSTRACT

A power line communication control system for coupling between an power line and a load is disclosed. The exemplary system is capable of simultaneously distributing electrical power and transmitting communication signals with minimized interference there-between. The exemplary system includes an inductive coupling input terminal and an inductive coupling output terminal. Each of the input and the output terminals includes a pair of series-connected inductors having substantially identical inductance value. Accordingly, the system is capable of may deliver the household power signal under common mode transmission while transmitting the communication signal using differential mode transmission, thereby minimizing the interference between the power line AC current and the communication signal.

15 Claims, 7 Drawing Sheets

POWER LINE COMMUNICATION CONTROL SYSTEM

CROSS-REFERENCE TO RELATED APPLICATIONS

This application claims priority from Chinese patent application Ser. No. 201510153801.6, filed on Apr. 2, 2015, which is incorporated herein by reference.

FIELD

The subject matter herein generally relates to power line control systems, and pertains particularly to power line control systems capable of transmitting communication signals and compatible with existing power line infrastructures.

TECHNICAL FIELD

Power line communication (PLC) presents a communication technology that enables data/signal transmission over existing power delivery infrastructure (e.g., power lines, electrical wires/cables). A power line communication system is a cost effective approach to enable electronic appliance control, in which the existing power line delivery infrastructure is utilized for the transmission of communication signals. Nevertheless, while modern power line communication systems possess beneficial characteristics such as reduced device footprint and the substantial removal of the need for additional communication network equipment (and thus the associated costs), there are still rooms for further improvement, e.g., in the areas such as signal noise/interference reduction capabilities and compatibility/adaptability issues with existing power line infrastructures.

BRIEF DESCRIPTION OF THE DRAWINGS

Implementations of the present technology will now be described, by way of example only, with reference to the attached figures.

DETAILED DESCRIPTION

Figure 1:
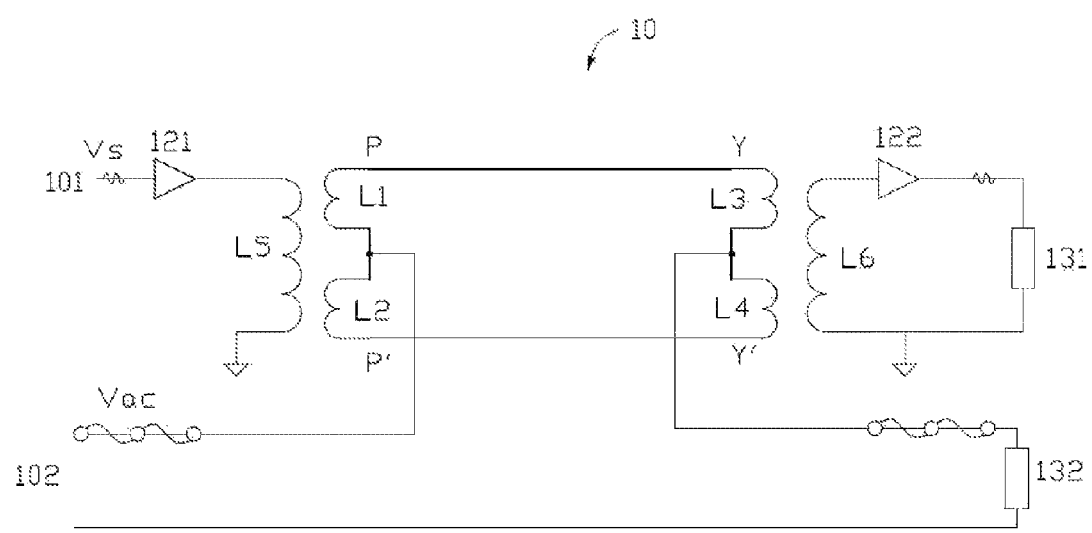
FIG. 1 is a schematic illustration of a power line communication control system in accordance with some embodiment of the instant disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features. The description is not to be considered as limiting the scope of the embodiments described herein.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

For consistency purpose and ease of understanding, like features are identified (although, in some instances, not shown) with like numerals in the exemplary figures. However, the features in different embodiments may differ in other respects, and thus shall not be narrowly confined to what is shown in the figures.

FIG. 1 is a schematic illustration of a power line communication control system 10 in accordance with some embodiment of the instant disclosure. The exemplary power line communication control system 10 is configured to interface between an electrical power delivery system (e.g., a power line) and a load, and comprises a plurality of inductors L1, L2, L3, L4, L5, L6, a communication signal input terminal 101, a power line signal input terminal 102, a communication signal output terminal 131, a power line signal output terminal 132, and signal amplifiers 121, 122. The power line signal input terminal 102 is configured to receive household alternating current signals Vac (e.g., electric power signals having alternating polarity (AC), typically having signal amplitude of 110 or 220V and frequency of 50 or 60 Hz). The communication signal input terminal 101 is configured to receive a communication signal Vs (e.g., a signal having an amplitude of about 5V, with a frequency of about 1000-10 M Hz). The communication signal output terminal 131 is configured to output a communication signal to a load (or to a next comparable structure). The power line signal output terminal 132 is configured to output a power line signal to a load (or a next comparable structure). The signal amplifier 121 is coupled between the communication signal input terminal 101 and the inductor L5 to ensure the one-way transmission of communication signals therethrough (thus preventing reverse signal transmission). The signal amplifier 122 is coupled between inductor L6 and the communication signal output terminal 131 to ensure the one-way output of communication signals, thus preventing reverse signal transmission.

The pair of inductors L1 and L2 is coupled in series to form an inductive coupling input terminal P-P'. Likewise, the inductor pair L3 and L4 is connected in series to form an inductive coupling output terminal Y-Y'. Depending on practical needs, however, some embodiments may utilize more than two series-connected inductors to form the inductive coupling input terminal. The inductive coupling input terminal P-P' and the inductive coupling output terminal output terminal Y-Y' are coupled in parallel, where one end of the inductor L1 is connect to one end of the inductor L3, while one end of the inductor L2 is coupled to one end of the inductor L4. The inductive coupling input terminal P-P' and the inductive coupling output terminal Y-Y' are respectively coupled to a power line signal input terminal 102 and a power line signal output terminal 132, and may be respectively coupled to a ground of an AC power source. The inductor L5 is inductively coupled to one side of the inductive coupling input terminal P-P'. Likewise, the inductor L6 is inductively coupled to one side of the inductive coupling output terminal Y-Y'.

Figure 2:
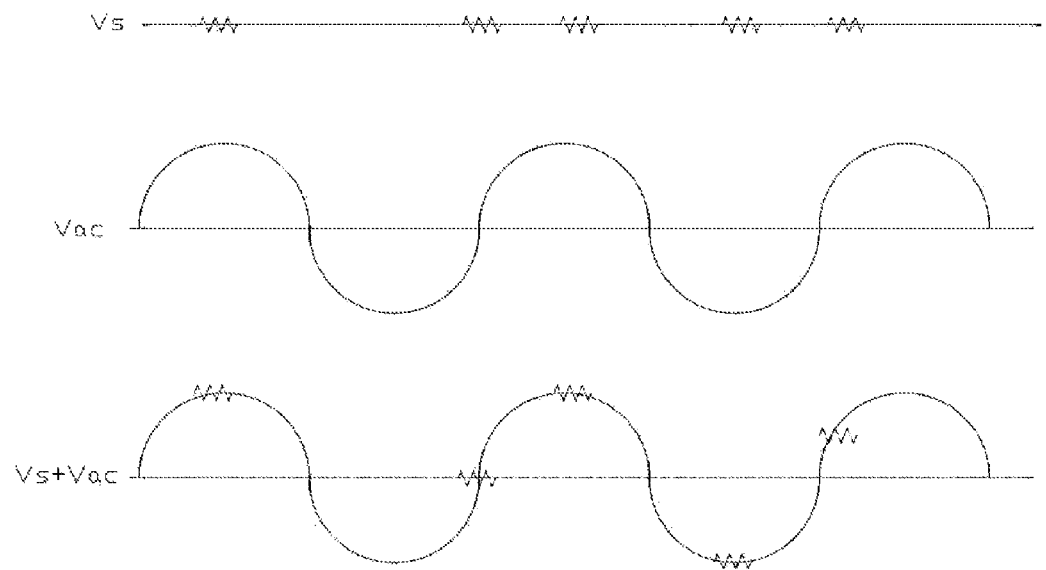
FIG. 2 provides illustrative waveform diagrams of a communication signal, a power line AC signal, and a combined signal in accordance with some embodiments of the instant disclosure.

FIG. 2 provides illustrative waveform diagrams of a communication signal, a power line AC signal, and a combined signal in accordance with some embodiments of the instant disclosure. The AC power line signal Vac typically comprises a continuous waveform having amplitude of about 220 or 110 Volts, and a frequency of about 60 or 50 Hz. The communication signal Vs typically comprises alternating current signal having amplitude of about 0.1 to 20V and frequency of about 1000 to 10 M Hz, and does not necessarily require a continuous waveform. The communication signal Vs may be superimposed on the power line signal Vac and transmitted through existing power line delivery infrastructure. This ability to simultaneously deliver electrical power and transmit communication signal provides a cost effective option for signal communication applications without the need for additional hardware investments, which may translate to the reduction of circuit cost and better utilization of device component space.

The principle of operation for the exemplary power line communication control system is delineated as follows.

Figure 3:
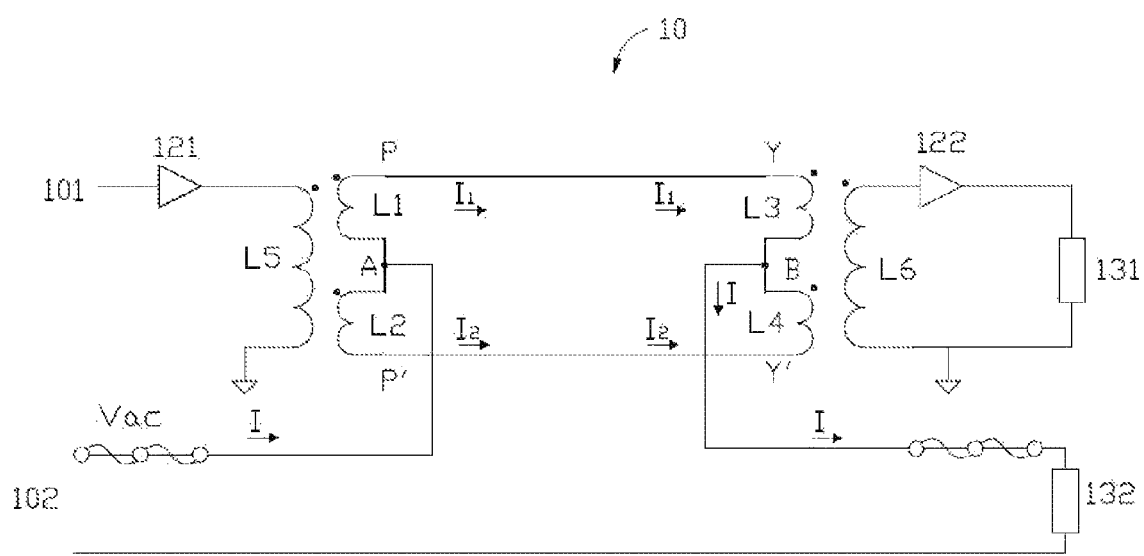
FIG. 3 is a schematic illustration showing a power line AC signal (including noise) transmission path in a power line communication control system in accordance with some embodiments of the instant disclosure.

FIG. 3 is a schematic illustration showing a power line AC signal (including noise) transmission path in a power line communication control system in accordance with some embodiments of the instant disclosure. During the transmission of a power line AC signal (e.g., Vac), the alternating current I of the power line signal Vac is inputted from the power line signal input terminal 102 through a node A defined between the series-connected inductors L1 and L2 of the inductive coupling input terminal P-P'. In the instant exemplary embodiment, the inductance values of the inductors L1 and L2 are substantially identical. In some embodiments where the length of power line is long, the inductance value of one of the series-connected inductor (e.g., L1) of the inductive coupling input terminal P-P' may be configured to be not less than 25% of that of the other (e.g., L2). In some embodiments where the length of power line is short, the inductance value of one of the series-connected inductor (e.g., L1) of the inductive coupling input terminal P-P' may be arranged to be not less than 35% of that of the other (e.g., L2). The inputted AC current I is then divided into branch currents I1 and I2, which are respectively transmitted toward the inductive coupling output terminal Y-Y'. The branch currents I1 and I2 once again merged to form an AC current I at a node B defined between the series-connected inductors L3 and L4 of the inductive coupling output terminal Y-Y', and subsequently outputted via the power line signal output terminal 132 to a load (or a next comparable input terminal). With the abovementioned arrangement, the power line signal Vac may be delivered under common mode transmission, i.e., in-phase signals with substantially identical amplitude.

Figure 4:
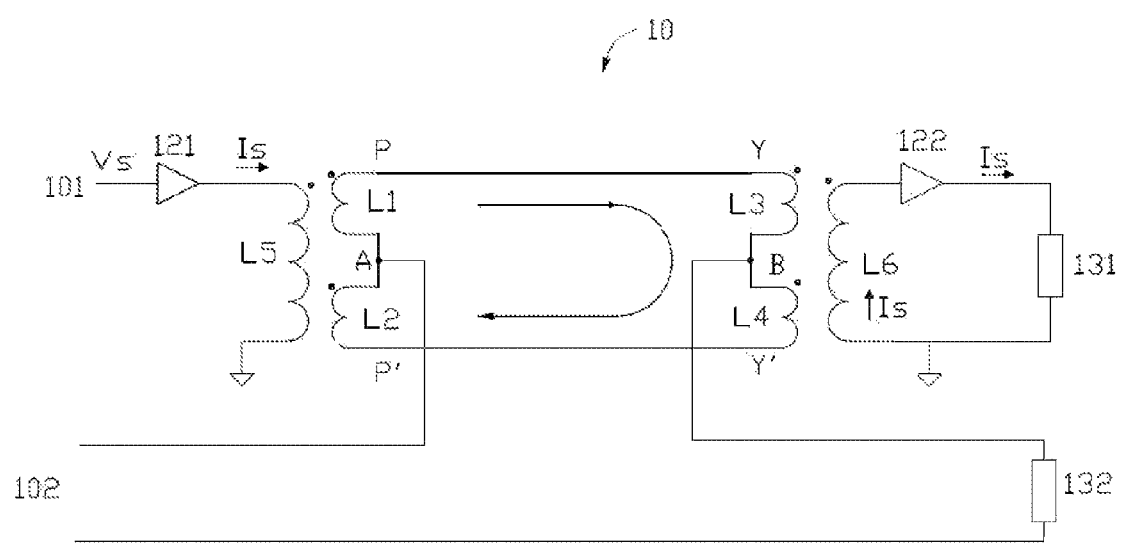
FIG. 4 is a schematic illustration showing a communication signal in a power line communication control system in accordance with some embodiments of the instant disclosure.

FIG. 4 is a schematic illustration showing a communication signal in a power line communication control system in accordance with some embodiments of the instant disclosure. During the transmission of a communication signal (e.g., Vs), a current Is of the communication signal Vs is inputted from the communication signal input terminal 101 and transmitted to inductor L5 that is inductively coupled to inductors L1 and L2 of the inductive coupling input terminal P-P'. The induced current from the inductive coupling input terminal P-P' is then transmitted to inductors L3 and L4 of the inductive coupling output terminal Y-Y', and subsequently caused the generation of a corresponding induced current Is (having substantially identical yet out-of-phase waveform compared to that of the input signal Vs). The off-phase signal is then fed to a load or a next comparable input terminal through the communication signal output terminal 131. Accordingly, the communication signal may be transmitted under differential mode, i.e., out-of-phase signals with substantially identical amplitude. Generally speaking, signal transmission in differential mode is suitable for noise filtering applications.

Figure 5:
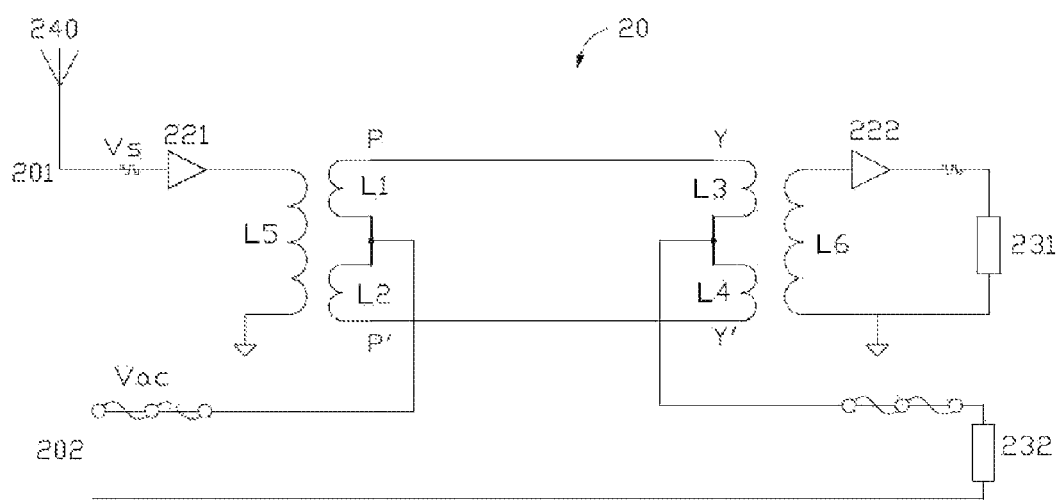
FIG. 5 is a schematic illustration of a power line communication control system in accordance with some embodiments of the instant disclosure.

FIG. 5 is a schematic illustration of a power line communication control system 20 in accordance with some embodiments of the instant disclosure. The exemplary power line communication control system 20 is substantially comparable to the exemplary system 10 shown in FIG. 1, and comprises a plurality of inductors L1, L2, L3, L4, L5, L6, a communication signal input terminal 201, a power line signal input terminal 202, a communication signal output terminal 231, a power line signal output terminal 232, and signal amplifiers 221, 222. The exemplary power line communication control system 20 differs from the previous example (e.g., system 10) in that it further comprises a wireless signal receiving unit (e.g., antenna 240) for receiving an external communication signal, and in a comparable fashion, an induced communication signal may be generated at the communication signal output terminal 231 and outputted to a load (or a next comparable structure).

Figure 6:
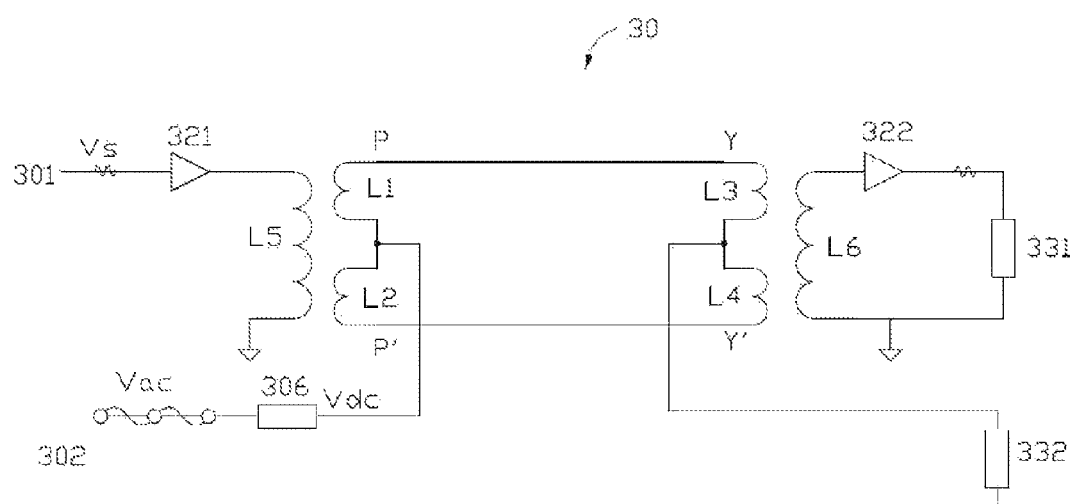
FIG. 6 is a schematic illustration of a power line communication control system in accordance with some embodiments of the instant disclosure.

FIG. 6 is a schematic illustration of a power line communication control system 30 in accordance with some embodiments of the instant disclosure. The exemplary power line communication control system 30 is substantially comparable to the exemplary system 10 shown in FIG. 1, and comprises a plurality of inductors L1, L2, L3, L4, L5, L6, a communication signal input terminal 301, a power line signal input terminal 302, a communication signal output terminal 331, a power line signal output terminal 332, and signal amplifiers (e.g., diodes) 321, 322. The communication signal input terminal 301 is configured to receive a communication signal Vs (e.g., a signal having an amplitude of about 5V, with a frequency of about 1000-10 M Hz). The power line signal input terminal 302 is configured to receive household alternating current signals Vac (e.g., an AC power signal having amplitude of about 110V and frequency of about 60 Hz). The exemplary power line communication control system 30 differs from the previous example (e.g., system 10) in that it further comprises an AC to DC convertor 306 (arranged at the power line signal input terminal 302), which is configured to convert an input AC signal into a direct current signal Vdc for adapting conventional household appliances that require direct current power input. The communication signal output terminal 331 is configured to generate a communication signal to a load (or to a next comparable structure). A corresponding DC signal (e.g., corresponds to the input signal Vdc) may be generated through the power line signal output terminal 332 and outputted to a load (or a next comparable structure). The signal amplifier 321 is coupled between the communication signal input terminal 301 and the inductor L5 to ensure the one-way transmission of communication signals therethrough (thus preventing reverse signal transmission). Likewise, the signal amplifier 322 is coupled between inductor L6 and the communication signal output terminal 331 to ensure the one-way output of communication signals, thus preventing reverse signal transmission.

Figure 7:
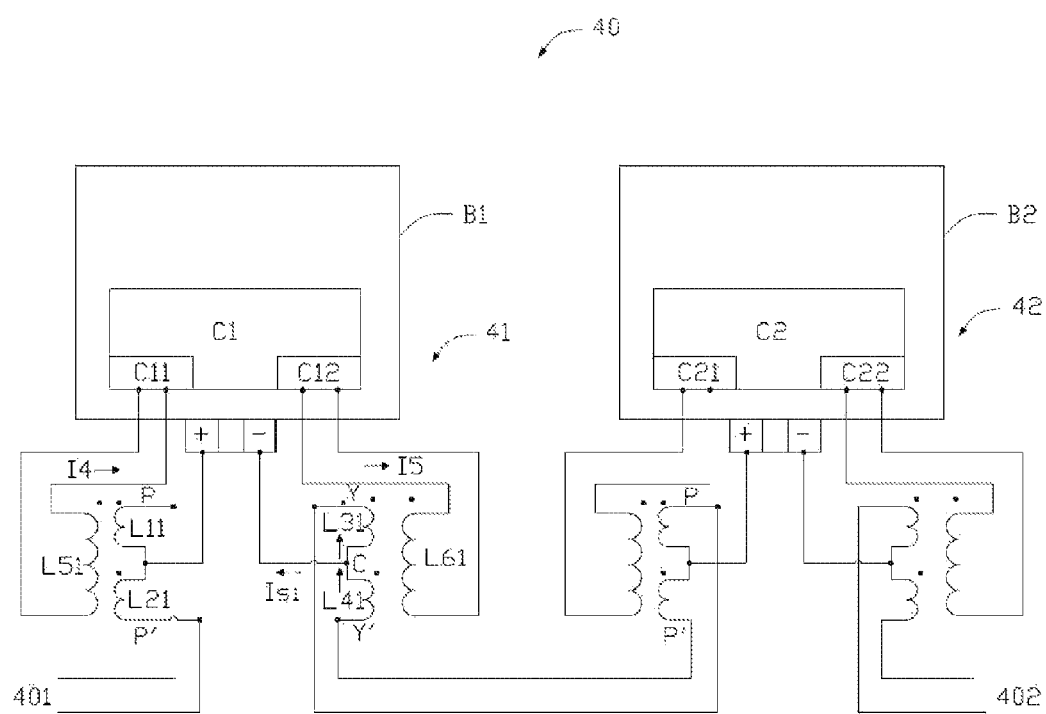
FIG. 7 is a schematic illustration of a power line communication control system in accordance with some embodiments of the instant disclosure.

FIG. 7 is a schematic illustration of a power line communication control system 40 in accordance with some embodiments of the instant disclosure. The exemplary power line communication control system 40 comprises two sub-systems 41 and 42. Each of the sub-systems 41/42 comprises a battery system B1/B2. The battery system B1/B2 respectively comprises a control unit C1/C2. The control unit C1 includes a control signal input terminal C11 and a control signal output terminal C12. Similarly, the control unit C2 includes a control signal input terminal C21 and a control signal output terminal C22. The control signal input terminal C11 and C21 respectively define the positive terminal of the battery systems B1, B2. Conversely, the control signal output terminal C12 and C22 respectively define the negative terminals of the battery systems B1, B2. The power line communication control system 40 further comprises a plurality of inductors (e.g., L11-L61), a power line signal input terminal 401, and a power line signal output terminal 402. The number of sub-systems (e.g., sub-system 41/42) may be provided in accordance with application requirements and practical needs. The sub-systems 41 and 42 cooperatively form a series-connected battery system. Such circuit design arrangement may prevent current overload that may potentially damage battery control and communication components, thereby providing circuit protection functions.

The pair of inductors L11 and L21 are connected in series and cooperatively form an inductive coupling input terminal P-P' for receiving an external power line signal. A communication signal 14 may be obtained through the inductive coupling between inductor L51 and the series-connected L11 and L21, and subsequently transmitted to the control signal input terminal C11 of the control unit C1 of the battery system B1. The control unit C1 may then conduct signal processing, and subsequently outputs a corresponding signal 15 through its control signal output terminal C12 to the inductor L61, which is inductively coupled to the series-connected inductors L31 and L41 on the other side. Nevertheless, some embodiments may utilize more than two series-connected inductors to obtain comparable results, and may transmit signals successively to a next circuit component having comparable structure, thereby repetitively conducting the abovementioned signal transmission operation.

Since the inductor L61 is inductively coupled to the series-connected inductors L31 and L41, if the inductors L31 and L41 have substantially identical inductance values, the induced currents (by inductor L61) respectively through the inductors L31 and L41 may be of the same direction (as indicated by the arrows) with substantially identical magnitude. Accordingly, with respect to node C, there occur three component currents: a first and a second component current that respectively flow through the inductors L31, L41 (having the same direction), and a component current Is1 that flows toward the battery system B1. Because the electrical currents through the inductors L31 and L41 are of the same direction and magnitude, according to Tehvenin's equivalent circuits (which states that the net input current into a node is equivalent to the net current output), the current Is1 through the battery system B1 would be zero. This may prevent the signal output terminal C12 from current overloading. The battery system B1 may be a solar battery system. According to embodiments of the instant disclosure, multiple solar battery systems may be series-connected and connected to a single set of power line, thereby enabling convenient feedback of solar power into a conventional AC power system.

In the instant embodiment, the inductance value of inductors L11 and L21 is substantially identical, and the inductance value of inductors L31 and L41 is substantially equal. The power line signal input terminal 401 is electrically connected to the inductive coupling input terminal P-P'(at the respective ends of the inductors L11, L21); one end thereof may be connected between inductors L11 and L22, while the other end connected to ground. The control signal output terminal C12 is configured to output a communication signal (e.g., which corresponds to the signal current I5) through inductor L61 to the inductive coupling output terminal Y-Y' formed by the series-connected inductors L31, L41. The positive terminal of the battery system B1 is connected to a node defined between inductors L11 and L21 of the inductive coupling input terminal P-P', while the negative terminal of the battery system B1 is connected to a node (e.g., node C) defined between inductors L31 and L41. The inductive coupling output terminal Y-Y' may then be connected (through the respective ends of the inductors L31 and L41) to the inductive coupling input terminal P-P' of a next comparable structure (e.g., the sub-control system 42, which shares substantially identical component arrangement of the sub-system 41). With such arrangement, multiple sub-systems with substantially comparable structure may be connected repetitively for transmitting externally inputted power signals.

Accordingly, some embodiments of the instant disclosure provides a power line communication control system for coupling between a power line and a load, which comprises: an inductive coupling input terminal and an inductive coupling output terminal arranged in parallel connection, where each of the inductively coupling input and output terminals comprises a pair of series-connected inductors; a power line signal input terminal electrically coupled to a node defined between the series-connected inductors of the inductive coupling input terminal; a power line signal output terminal electrically coupled to a node defined between the series-connected inductors of the inductive coupling output terminal; a communication signal input terminal inductively coupled to one side of the inductive coupling input terminal through an input inductor; and a communication signal output terminal inductively coupled to one side of the inductive coupling output terminal through an output inductor.

Accordingly, some embodiments of the instant disclosure provides a power line communication control system for coupling between a DC power supply and a load, which comprises: a parallel-coupled inductive coupling input terminal and inductive coupling output terminal, where each of the inductively coupling input and output terminals comprises a pair of series-connected inductors; a power line signal input terminal electrically coupled to a node defined between the series-connected inductors of the inductive coupling input terminal; a power line signal output terminal electrically coupled to a node defined between the series-connected inductors of the inductive coupling output terminal; a communication signal input terminal inductively coupled to one side of the inductive coupling input terminal through an input inductor; and a communication signal output terminal inductively coupled to one side of the inductive coupling output terminal through an output inductor.

Accordingly, some embodiments of the instant disclosure provides a power line communication control system, which comprises: at least one sub-control system, the sub-control comprising: a parallel-coupled inductive coupling input terminal and inductive coupling output terminal, where each of the inductively coupling input and output terminals comprises a pair of series-connected inductors; a control unit comprising a control signal input terminal arranged to receive a power line signal and a communication signal from the inductive coupling input terminal, and a control signal output terminal arranged to transmit the power line signal and the communication signal to the conductive coupling output terminal.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A power line communication control system for coupling between a power line and a load, comprising:
   a parallel-coupled inductive coupling input terminal and inductive coupling output terminal,
      wherein each of the inductively coupling input and output terminals comprises a pair of series-connected inductors;
   a power line signal input terminal electrically coupled to a node defined between the series-connected inductors of the inductive coupling input terminal;
   a power line signal output terminal electrically coupled to a node defined between the series-connected inductors of the inductive coupling output terminal;
   a communication signal input terminal inductively coupled to one side of the inductive coupling input terminal through an input inductor; and
   a communication signal output terminal inductively coupled to one side of the inductive coupling output terminal through an output inductor.

2. The system in accordance with claim 1, wherein the inductance value of one of the series-connected inductors of the inductive coupling input terminal is not less than 25% of that of the other.

3. The system in accordance with claim 1, wherein the inductive value of one of the series-connected inductors of the inductive coupling output terminal is not less than 25% of that of the other.

4. The system in accordance with claim 1, further comprising an input signal amplifier arranged between the communication signal input terminal and the input inductor.

5. The system in accordance with claim 4, further comprising an output signal amplifier arranged between communication signal output terminal and the output inductor.

6. A power line communication control system for coupling between a direct current (DC) power supply and a load, comprising:
   a parallel-coupled inductive coupling input terminal and inductive coupling output terminal,
      wherein each of the inductively coupling input and output terminals comprises a pair of series-connected inductors;
   a direct current signal input terminal electrically coupled to a node defined between the series-connected inductors of the inductive coupling input terminal;
   a direct current signal output terminal electrically coupled to a node defined between the series-connected inductors of the inductive coupling output terminal;
   a communication signal input terminal inductively coupled to one side of the inductive coupling input terminal through an input inductor; and
   a communication signal output terminal inductively coupled to one side of the inductive coupling output terminal through an output inductor.

7. The system in accordance with claim 6, wherein the inductance value of one of the series-connected inductors of the inductive coupling input terminal is not less than 25% of that of the other.

8. The system in accordance with claim 6, wherein the inductive value of one of the series-connected inductors of the inductive coupling output terminal is not less than 25% of that of the other.

9. The system in accordance with claim 8, further comprising an input signal amplifier arranged between the communication signal input terminal and the input inductor.

10. The system in accordance with claim 9, further comprising an output signal amplifier arranged between the communication signal output terminal and the output inductor.

11. A power line communication control system, comprising:
   at least one sub-control system coupled to a battery system, each sub-control system comprising:
      an inductive coupling input terminal configured to establish parallel-connection with an inductive coupling output terminal of a downstream comparable sub-control system,
         wherein the inductively coupling input terminal comprises a pair of series-connected inductors;
      an inductive coupling output terminal configured to establish parallel-connection with an inductive coupling input terminal of an upstream comparable sub-control system,
         wherein the inductively coupling output terminal comprises a pair of series-connected inductors; and
      a control unit comprising:
         a control signal input terminal arranged to receive a power line signal and a communication signal from the inductive coupling input terminal, and
         a control signal output terminal arranged to transmit the power line signal and the communication signal to the inductive coupling output terminal.

12. The system in accordance with claim 11, wherein the inductive coupling output terminal is coupled to an inductive coupling input terminal of a next sub-control system.

13. The system in accordance with claim 12, wherein the inductive coupling output terminal is coupled to the inductive coupling input terminal of the next sub-control system for transmitting an externally inputted communication signal.

14. The system in accordance with claim 11, wherein the control unit comprises another battery system.

15. The system in accordance with claim 14, wherein the control unit is a solar battery system.

* * * * *